United States Patent [19]
Shirai et al.

[11] Patent Number: 5,341,301
[45] Date of Patent: Aug. 23, 1994

[54] DIVERSITY TYPE GLOBAL POSITIONING SYSTEM FOR MOTOR VEHICLES

[75] Inventors: Kazunari Shirai, Obu; Yoshitaka Ozaki, Anjo; Hiroyasu Fukaya, Nagoya, all of Japan

[73] Assignee: Nippondenso Co., Ltd., Kariya, Japan

[21] Appl. No.: 812,102

[22] Filed: Dec. 23, 1991

[30] Foreign Application Priority Data

Dec. 27, 1990 [JP] Japan .................. 2-407959

[51] Int. Cl.$^5$ ............................ H04B 7/08; G01S 5/02
[52] U.S. Cl. .................................. 364/449; 342/457; 342/357
[58] Field of Search ................ 364/449, 452; 342/457, 342/464, 357

[56] References Cited

U.S. PATENT DOCUMENTS

| | | | |
|---|---|---|---|
| 4,719,469 | 1/1988 | Beier et al. | 342/434 |
| 4,928,107 | 5/1990 | Kuroda et al. | 364/449 |
| 4,983,980 | 1/1991 | Ando | 342/357 |
| 5,040,240 | 8/1991 | Keegan | 455/260 |
| 5,144,318 | 9/1992 | Kishi | 342/357 |
| 5,177,493 | 1/1993 | Kawamura | 343/713 |
| 5,185,761 | 2/1993 | Kawasaki | 375/1 |

FOREIGN PATENT DOCUMENTS 62-267899 11/1987 Japan .
1314982 12/1989 Japan .
1318982 12/1989 Japan .

OTHER PUBLICATIONS

Borel et al, "Texas Instruments Phase 1 GPS User Equipment" Global Positioning System, pp. 87–103, 1985.

Primary Examiner—Thomas G. Black
Assistant Examiner—Michael Zanelli
Attorney, Agent, or Firm—Cushman, Darby & Cushman

[57] ABSTRACT

This diversity type GPS system for a vehicle has first and second antennas mounted at first and second locations, respectively, inside a vehicle. First and second high frequency amplifiers and an antenna changer apply the signals received by the first and second antennas to first and second SS demodulators. The first and second SS demodulators simultaneously perform search operations for satellites, and demodulate rf signals (demodulated data) from the searched out satellites. An arithmetic and control unit computes a position of the vehicle from the demodulated data once three or more sets of demodulated data are available. The arithmetic and control unit also controls the antenna changer to switch the antenna from which a demodulator receives signals so as to improve the searching operations of the demodulators.

19 Claims, 11 Drawing Sheets

DIVERSITY TYPE GLOBAL POSITIONING SYSTEM FOR MOTOR VEHICLES

BACKGROUND OF THE INVENTION

1. Field of the Invention

This invention relates to a GLOBAL POSITIONING SYSTEM (GPS) for motor vehicles which receives rf signals from artificial satellites (hereinafter referred to simply as the satellites).

2. Description of the Prior Art

Conventional GPS for motor vehicles is equipped with a single antenna to receive rf signals from satellites. Since the antenna is mounted on the outside of a vehicle, e.g. on an outer wall of a roof of the vehicle, the conventional GPS has such a problem that it will degrade the external appearance of the vehicle. On the other hand, when the antenna is mounted inside of the vehicle, the antenna will not debase the outside appearance of the vehicle, but the roof and columns of the vehicle will disturb radio propagation. That is, rf signals usually receivable outside of the vehicle can not be properly received inside of the vehicle where only a single antenna is employed.

The Japanese laid-open Patent Applications Nos. 62-267899, 1-314982, and 1-318982 disclose diversity type GPS in which that two antennas are mounted inside of the vehicle. In this diversity type GPS in which only one antenna is selectively used at one time. Therefore, the system functions merely equally as the system equipped with one antenna on the outside of the vehicle, having no advantage of use of the two antennas.

In this type of GPS, since rf signals from three or four space satellites are received to determine a present position of a vehicle, it is necessary to quickly catch the rf signals from the satellites.

SUMMARY OF THE INVENTION

It is an object of the present invention to provide a diversity type GPS capable of receiving rf signals from a plurality of satellites faster than a prior-art GPS.

To attain this object, in accordance with this invention, the diversity type GPS comprises first and second antennas which are mounted inside of the vehicle and rf signals received through the first and second antennas are selectively inputted into first and second demodulators, so that rf signals from the first and second satellites may be caught simultaneously by means of these first and second demodulators.

The foregoing object and other objects will become apparent when a preferred embodiment of this invention is considered in connection with the drawings.

DESCRIPTION OF THE PREFERRED EMBODIMENTS

Figure 1:
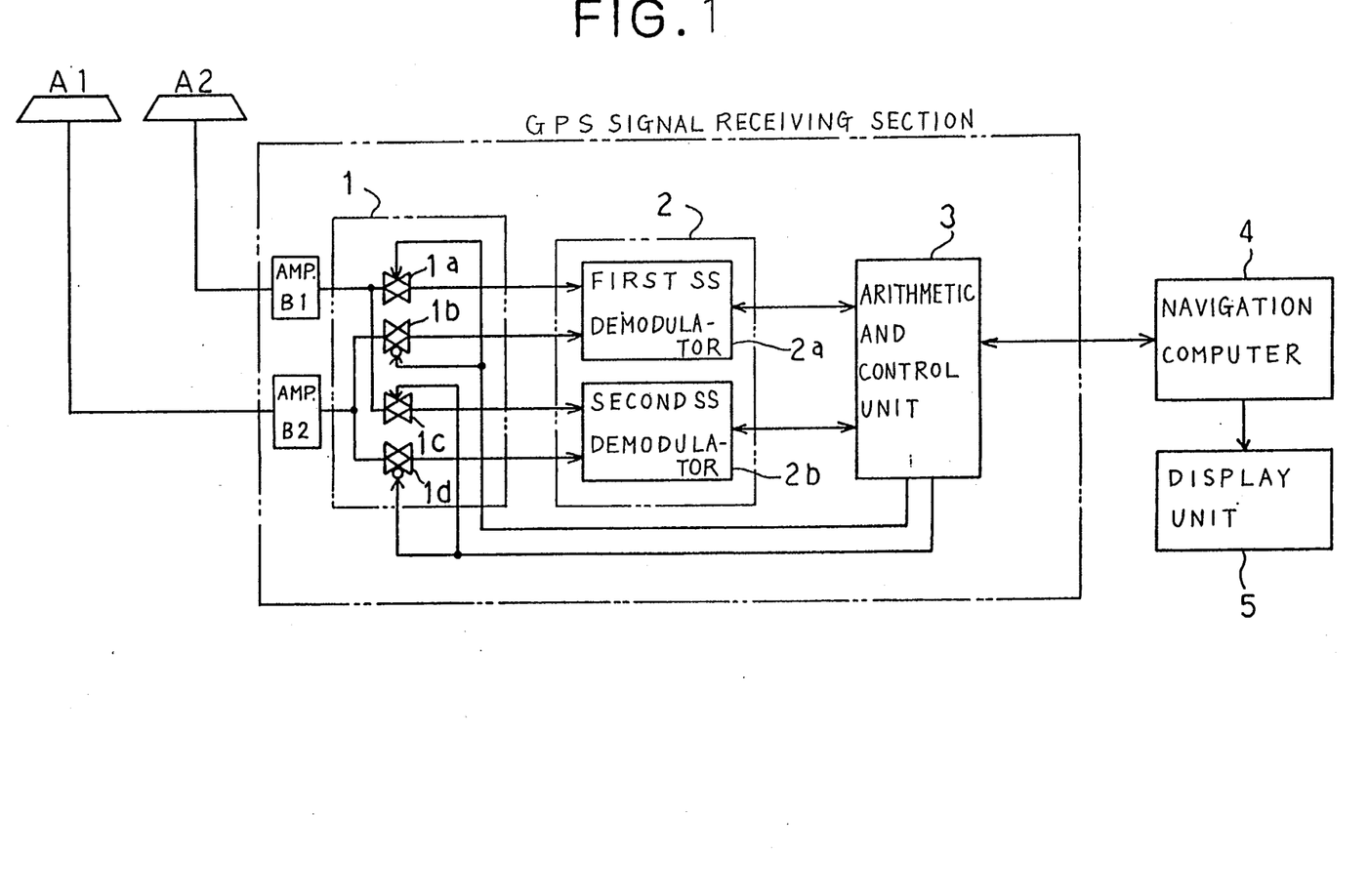
FIG. 1 is a general block diagram showing the general constitution of a first embodiment of a signal receiving system of a GPS according to the present invention.
Figure 2:
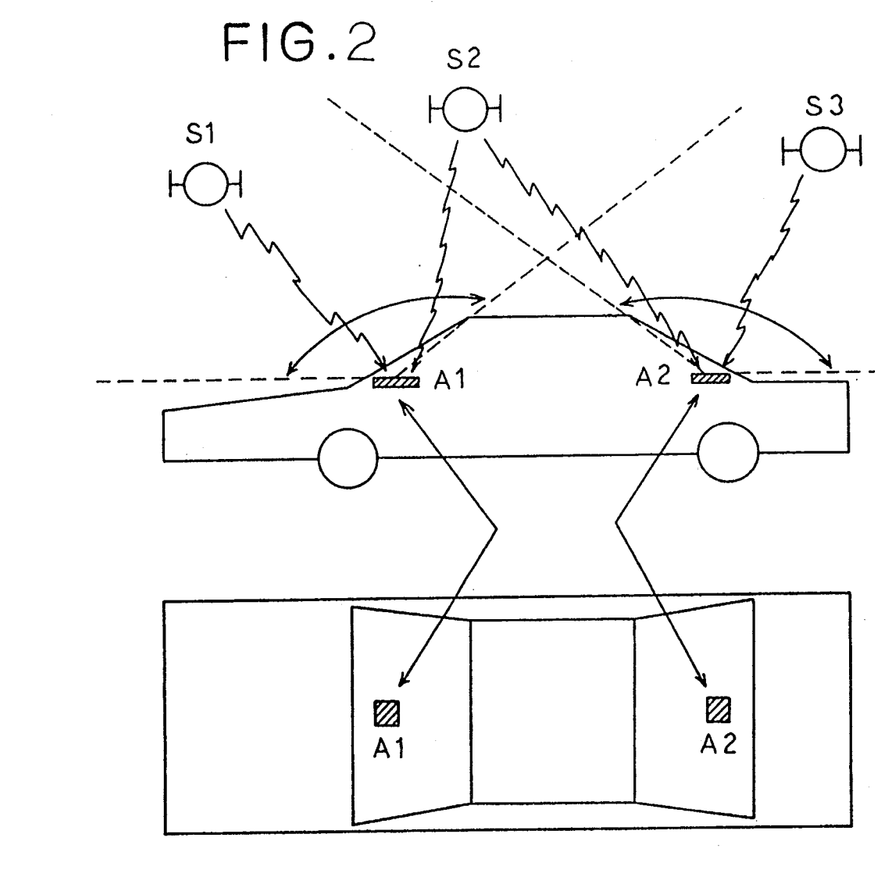
FIG. 2 is an explanatory view of an antenna mounting position.

In FIG. 1, antennas A1 and A2 are mounted on a dashboard and on a rear tray respectively in the room of a motor vehicle as shown in FIG. 2 for the reception of rf signals from satellites S1, S2, S3, etc. The rf signals thus received by the antennas A1 and A2 are amplified by first and second high-frequency amplifiers B1 and B2, being selectively inputted into an SS demodulator 2 through an antenna changer 1. The antenna changer 1 is composed of analog switches $1a$ to $1d$ ($1a$ and $1b$, and $1c$ and $1d$ operate reversely to each other), such as semiconductor switches. The analog switches $1a$ and $1b$ are operated by a first and a second antenna selection command from an arithmetic and control unit 3 to output a received signal from either the antenna A1 or the antenna A2 to a first SS demodulator $2a$, while the analog switches $1c$ and $1d$ output to a second SS demodulator $2b$ a received signal from either the antenna A1 or the antenna A2.

The first and second SS demodulators $2a$ and $2b$ are identical in constitution, and have a PN code signal predetermined by each satellite. When having received a search command for a specific satellite from the arithmetic and control unit 3, the system is correlated with a rf signal received through the antenna A1 or A2 by the use of the PN code signal for the satellite. In this correlation, presuming that the satellite has been searched out, the search signal is sent out to the arithmetic and control unit 3, and, at the same time, the rf signal from the satellite is demodulated, then successively outputting demodulation data to the arithmetic and control unit 3.

The arithmetic and control unit 3 effects arithmetic processing subsequently described, produces a command to the SS demodulator 2 for searching out a specific satellite, and, at the same time, performs the changeover control of the antennas A1 and A2 in order to search out the satellite. When at least three satellites have been searched out, the present position of a vehicle is computed in accordance with distances from these satellites, thus a signal indicative of the present position being sent to a navigation computer 4.

The navigation computer 4 functions to display on a display unit such as a CRT a road map in accordance with a road map information from a storage medium (e.g. an optical disk) in which the road map information is stored, and further to input a signal of present position from the arithmetic and control unit 3 and rf signals from various sensors (e.g. an terrestrial magnetism sensor, a gyroscope, a wheel speed sensor, a steering sensor, etc.) which are not shown in the drawings. The navigation computer 4 calculates the optimum present position and displays on the display unit 5 the present position of a vehicle on the road map. The GPS signal receiving section comprises the first and second high-frequency amplifiers B1 and B2, the antenna changer 1, the SS demodulator 2, and the arithmetic and control unit 3.

Next, the operation of the signal receiving section of the GPS will be explained.

Figure 3:
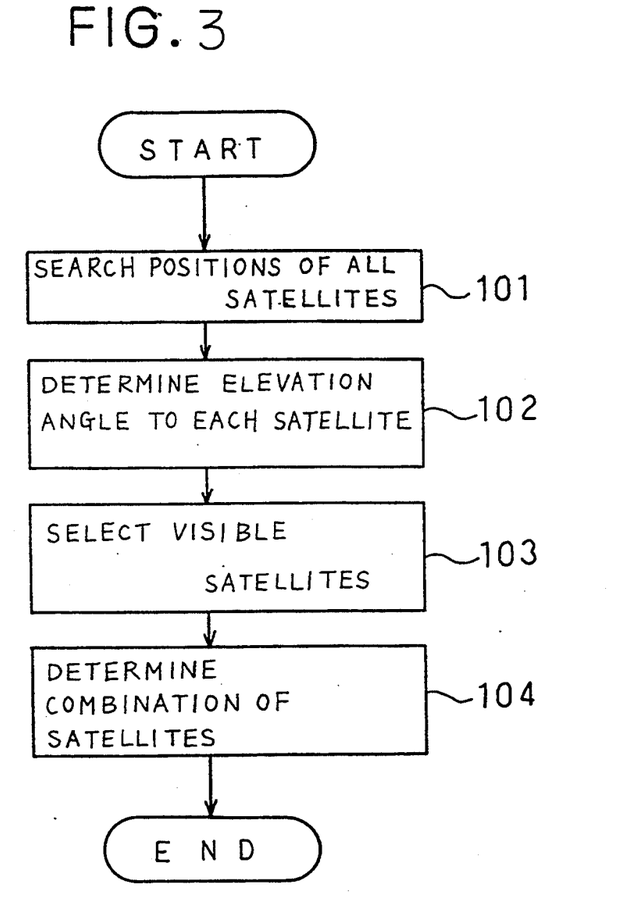
FIG. 3 is a flowchart showing satellite selection processing in an arithmetic and control unit.

First, the arithmetic and control unit 3 starts with processing at Step 101 shown in FIG. 3, searching for the positions of all satellites. Concretely speaking, the present position of each satellite is searched from a relation between a so-called almanac data preset for each satellite and a present time. Subsequently, at Step 102, an elevation angle to each satellite is determined from the approximate present position of a vehicle which is previously measured and stored. Then, at Step 103, satellites located at a fixed angle of elevation or higher are selected as visible satellites according to the elevation thus obtained. At Step 104 is determined a combination of satellites of selected visible satellites which provide the best PDOP. This PDOP means the index of precision degradation of position which is the optimum degree of geometric arrangement of four optional combinations of visible satellites. By this satellite selection by use of this PDOP, there are selected up to seven satellites including four satellites and three preparatory satellites. The quantity of the satellites thus selected is expressed by the character n, that is, the satellites are denoted by numerals 1-n.

Figure 4:
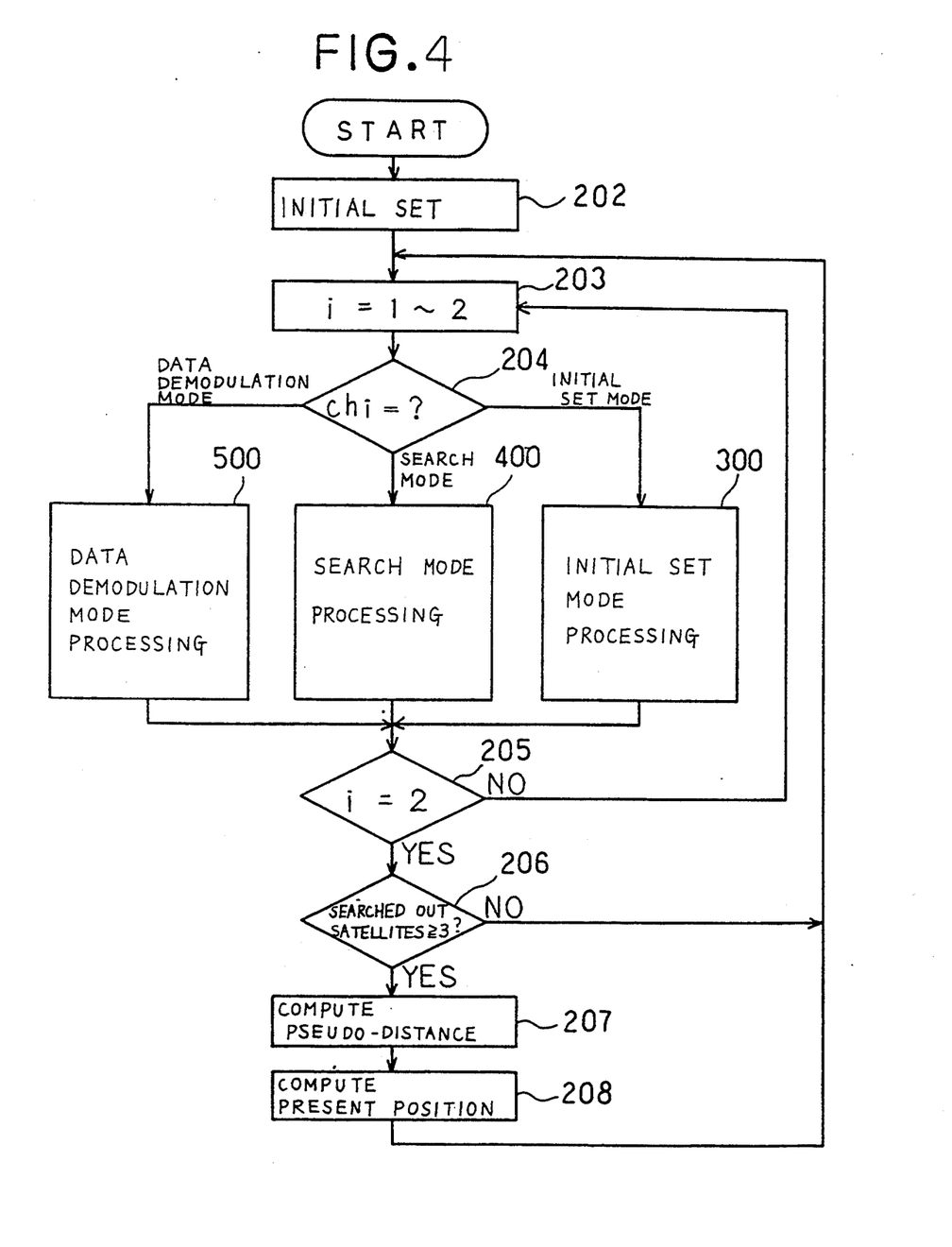
FIG. 4 is a flowchart showing a main processing of the arithmetic and control unit.

Thereafter the processing shown in FIG. 4 is effected. In this processing, initial setting (setting of all of i=1, ch1, ch2—blank mode, n=0, $t_{n1}$ and $t_{n2}$ to 5, e.g. to a value of 5 seconds, and resetting of a data correction finish flag) is performed at Step 202. Next Step 203 is a step for setting i with 1 and 2 alternately. The setting is i=1 at the time of the first arrival at Step 203. Step 204 is for deciding whether ch i is an initial set mode, a search mode or a data demodulation mode. At the first arrival at this step, i=1 and ch1=initial set mode, and therefore the processing proceeds to Step 300 for initial set mode processing. "ch1" is meant by a search processing by the first SS demodulator 2a. "ch2" is meant by a search processing by the second SS demodulator 2b.

Figure 5:
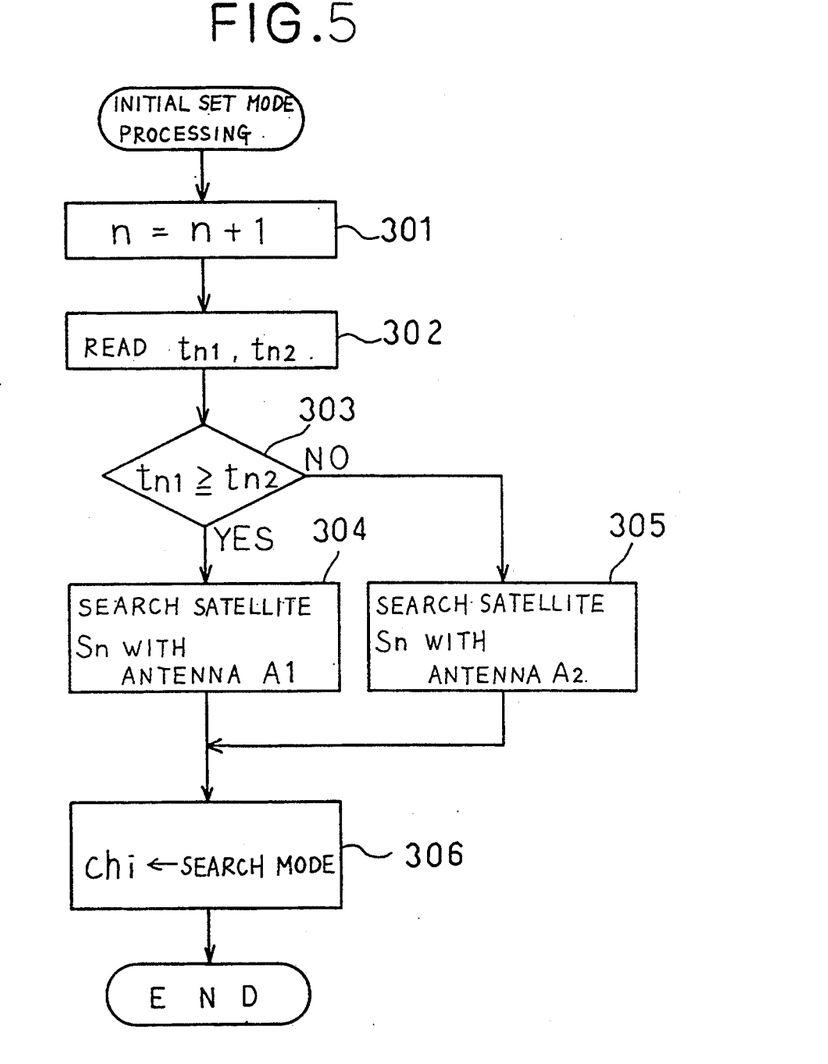
FIG. 5 is a flowchart showing a initial set mode processing shown in FIG. 4.

At Step 300 for initial set mode processing a result of addition is n=1 because n addition was already effected for the initial setting of n to 0 at Step 301 in FIG. 5. Thereafter, at Step 302, $t_{n1}$ and $t_{n2}$ are read out (each is set to 5 at the first arrival), then at Step 303 comparison is made between $t_{n1}$ and $t_{n2}$. Here, $t_{n1}$ specifies a search time of the antenna A1, while $t_{n2}$ specifies a search time of the antenna A2. At the first arrival, $t_{n1}=t_{n2}$, and therefore a decision thereof becomes YES. Then, at Step 304, a search command for searching the satellite S1 is produced to the first SS demodulator 2a, and further a command for selection of the antenna A1 is produced to the analog switches 1a and 1b of the antenna changer 1. Thus the first SS demodulator 2a performs search operation for searching out the satellite S1 in accordance with the rf signal received from the antenna A1. In this search operation, the center frequency of the rf signal received is changed with a Doppler shift resulting from satellite motion. And further since the rf signal received is modulated by the PN code signal, the receiving frequency of the receiver and the phase of the PN code signal generated inside are varied by a prescribed procedure, thus searching out rf signals from the satellites. In this search operation, when the rf signal from a satellite to be searched out has been received by the antenna, it is possible to receive the rf signal in 10 to 30 seconds when searching out the satellite for the first time after the power source is turned on, and in about one second thereafter.

At Steps 304 and 305, when i=1, a search command is produced to the first SS demodulator 2a, and also when i=2, the search con, hand is generated to the second SS demodulator 2b. Also, at Step 306, ch1 is set to the search mode.

Subsequently, the processing proceeds to Step 205 in FIG. 4, where since i=1, a decision of NO is made. Thus the processing proceeds to Step 203 to set i to 2. The ch2, being also at first in an initial set mode in the initial setting, proceeds to Step 300 for initial set mode processing to perform the above-described processing. In this case, however, since addition makes n=2 at Step 301, there is produced a search con, hand for the satellite S2 to the second SS demodulator 2b for the purpose of searching out the satellite S2, and further there is produced a command for the selection of the antenna A1 to the analog switches 1a and 1b of the antenna changer 1. The second SS demodulator 2b operates to search out the satellite S2 in accordance with a rf signal received through the antenna A1. At Step 306 ch2 is set to the search mode.

At Step 205, since i=2, the decision is made to YES, the procedure proceeding to Step 206. However, because at least three satellites have not been searched out yet, a decision of NO will be made, thus the procedure returns to Step 203, where, after setting i to 1, the procedure proceeds to Step 204. At Step 204 since ch1 has been set to the search mode, the procedure proceeds to Step 400 for search mode processing.

Figure 6:
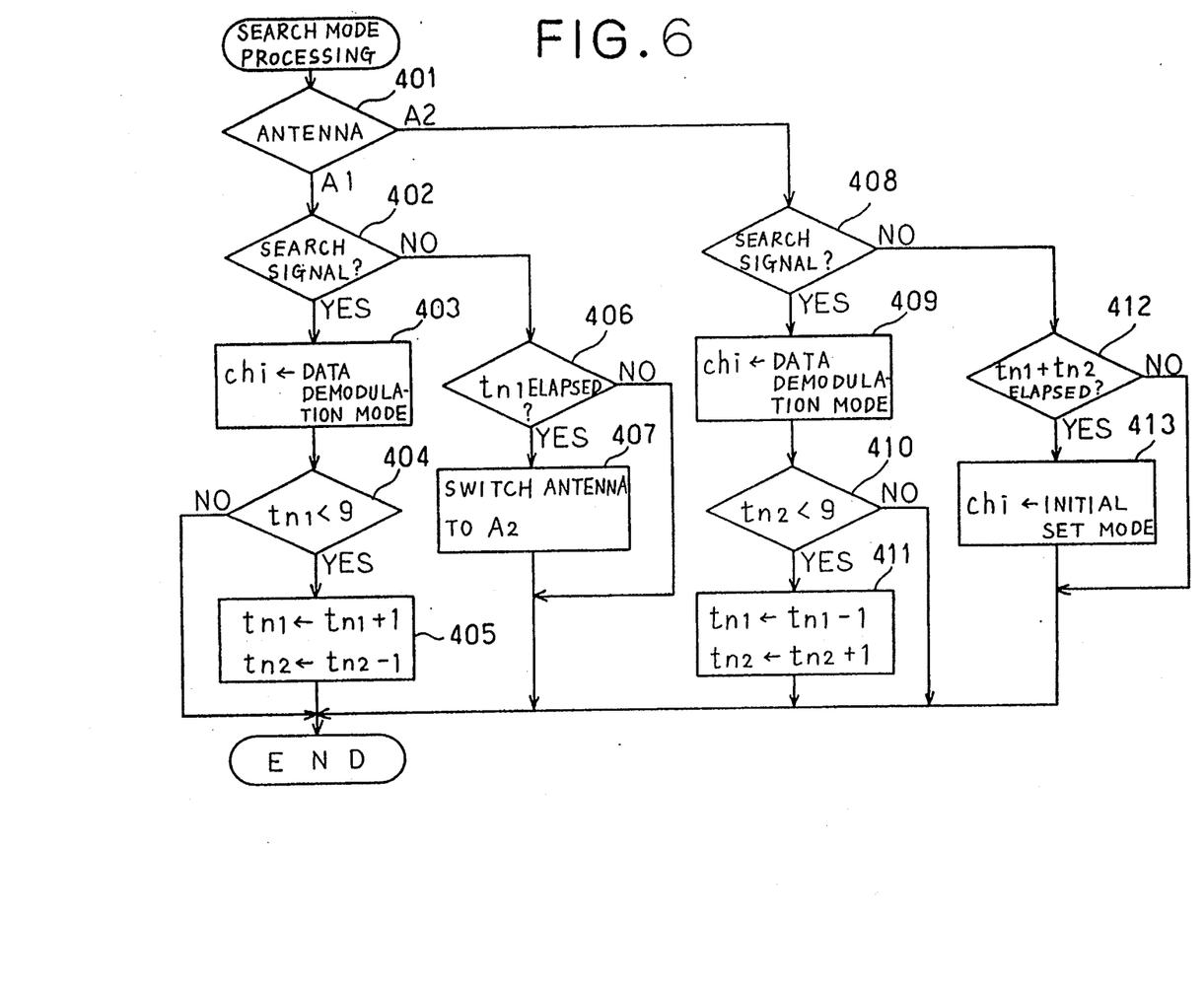
FIG. 6 is a flowchart showing a search mode processing shown in FIG. 4.

In this search mode processing, at the step 401 in FIG. 6, it is judged which one of the antennas A1 and A2 is used in chi (=ch1 in this case) to perform searching processing. This decision is effected by use of an antenna selection command in storage which has been produced from the arithmetic and control unit 3. At this time, as the search is being carried out in ch1 by means of the antenna A1, the processing proceeds to Step 402, where the decision is made on whether or not a search signal has been produced from the first SS demodulator 2a. In case where no search signal is produced yet immediately after the start of the search operation, the decision is made to NO. Then at step 406, it is decided whether or not the time of $t_{n1}$ (5 seconds in this case) has elapsed. When the time of $t_{n1}$ has not elapsed yet, the decision is made to NO.

On the other hand, when at Step 203 i is set to 2 through the processing at Step 205 which follows, the search mode processing of ch2 will be effected in the similar manner as described above. Thereafter the above-described similar processing will be conducted alternately for ch1 and ch2.

Subsequently, if the time of $t_{n1}$ has elapsed without searching out the satellite S1 by the antenna A1 for example, the decision of YES is made at the time of arrival at Step 406 in FIG. 6, thus the procedure proceeding to Step 407, where the antenna is switched from A1 to A2 to continue the search for the satellite S1. That is, there is produced a command for selecting the antenna A2 is supplied to the analog switches 1c and 1d of the antenna changer 1, thereby operating the first SS demodulator 2a to perform the search for the satellite S1 in accordance with a signal from the antenna A2. In a similar manner, in ch2 also when the time $t_{n1}$ has passed without finding out the satellite S2 through the antenna A1, the antenna A2 is used to search out the satellite S2 at Step 407. When the search operation has been started through the antenna A2, a change will be made of the processing to proceed to Step 408 at the time of its arrival at Step 401 in FIG. 6.

Subsequently if the search for the satellite S1 has failed even after a lapse of the time of $t_{n1}+t_{n2}$, the decision is made to YES at the time of arrival at Step 412 from Step 408, the procedure proceeding to Step 413, where ch1 will be set to a initial set mode. This means the decision of the initial set mode at the decision processing step 204 for the following ch1, in which the initial set mode processing shown in FIG. 5 will be executed. Since, in this initial set mode processing, n is updated at the addition step 301, thus n=2 becoming n=3. In the subsequent processing, therefore, the search for the satellite S3 will be made by the first demodulator 2a. Similarly, when the search for the satellite S2 has failed in ch2, n will be updated to 4 in the addition processing at Step 301 shown in FIG. 5; consequently, the search for the satellite S4 will be effected by the second demodulator 2b. If n exceeds the selected quantity of satellites as a result of updating will be reset to 1.

Subsequently, when for example the satellite S3 is successfully searched out by the first SS demodulator 2a and a search signal is produced from the first SS demodulator 2a, a decision of YES will be made at the time of arrival at Step 402 in FIG. 6, the procedure proceeding to Step 403, at which ch1 wit be set to a data demodulation mode. Then, the procedure proceeds to Step 404, where a decision will be made on whether or not $t_{n1}$ is 9. Since, at this time, $t_{n1}$ is 5, a decision of YES will be made; the procedure, then, will proceed to Step 405, where $t_{n1}$ is changed to $t_{n1}+1$ and $t_{n2}$ to $t_{n2}-1$. The success in searching out a specific satellite by the antenna A1 means that the antenna A1 will be effective in subsequent searches also, and accordingly from this point of view an importance is attached to the prolongation of the time required for searching out the satellites by the antenna A1. Updated values of tn1 and tn2 will be stored for convenience of subsequent time setting. At Step 404 tn1 is limited to 9 for the purpose of obtaining a maximum tn1 to tn2 ratio of 9:1.

Figure 7:
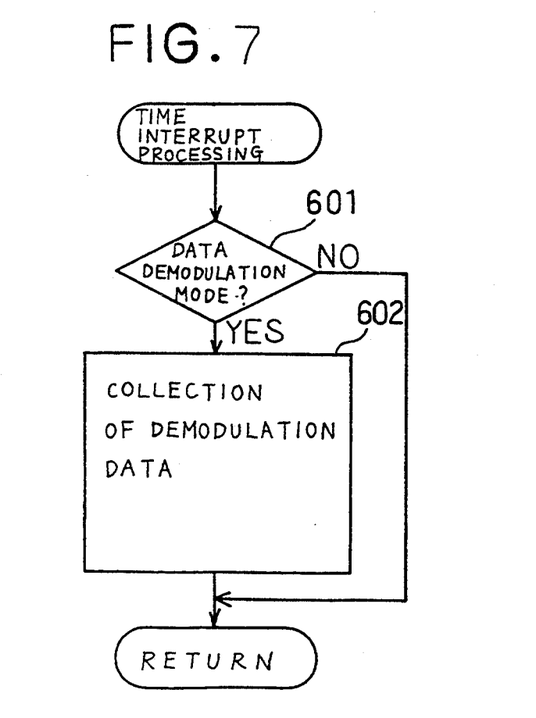
FIG. 7 is a flowchart showing a timer interrupt processing in the arithmetic and control unit.

In the arithmetic and control unit 3, 1-msec timer interrupts are effected as shown in FIG. 7. In the timer interrupts, a decision is made on whether or not the data demodulation mode has been set at Step 601. When, at this time, the data demodulation mode has been set, YES will be judged, thus starting collection (input for storage) of demodulation data from the first demodulator 2a in relation to the satellite Sn (in this case the satellite S3). In this collection of demodulation data, a satellite position information and a transmission time information are collected for a period of about one minute immediately after the power supply of the transmitter is turned on and thereafter every one hour. Also, a receiving time (correctly, the phase of PN code signal produced in the receiver) is collected for a period of about one second per time. When this collection has been finished, a data collection finished flag is set. In the interrupt processing at Steps 601 and 602, processing is effected correspondingly to chi so that the interrupt processing may be performed even when ch1 and ch2 have simultaneously entered the demodulation mode.

As a result of setting of the data demodulation mode in ch1, the procedure proceeds to the processing of the data demodulation mode as decided, at the time of arrival at Step 204 for ch1 processing. In this data demodulation mode processing, the processing is started at Step 501 in FIG. 8 to decide whether or not the data collection finish flag has been set. When the data collection is not finished yet, NO will be decided.

the collection of the

Figure 8:
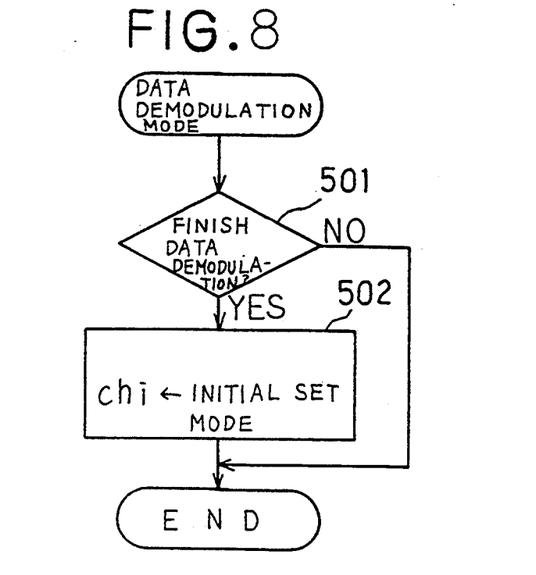
FIG. 8 is a flowchart showing a data demodulation mode processing shown in FIG. 4.

Thereafter, when demodulation data for the satellite S1 is finished by the interrupt processing shown in FIG. 7 and the data collection finish flag is set, a decision of YES will be made at the time of arrival at Step 501 in FIG. 8, from which the procedure proceeds to Step 502 for setting ch1 to a initial set mode. This means that, as described above, n is added and updated in the initial set mode processing in FIG. 5 conducted correspondingly to ch1, thereby performing the search processing for the next satellite Sn. At Step 502 the data collection finish flag previously set is reset.

Figure 9:
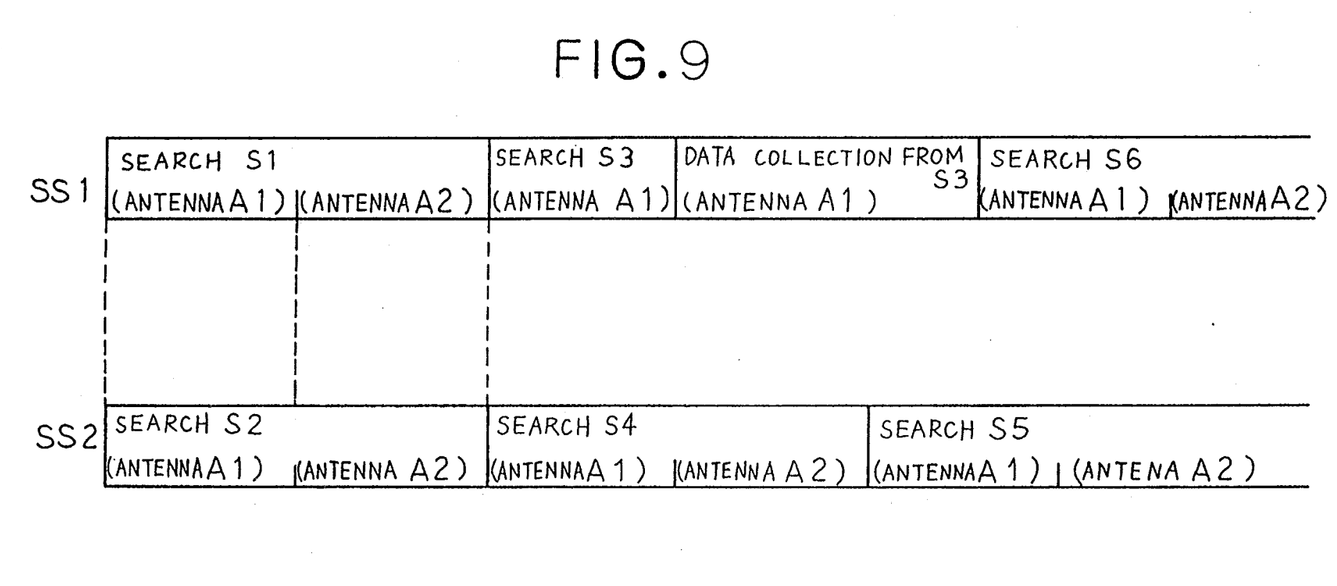
FIG. 9 is a timing chart used in the explanation of the operation of the first embodiment of the present invention.

Next, the operation of the first demodulator 2a (SS1) and the second demodulator 2b (SS2) described above will be further explained by referring to the timing chart shown in FIG. 9. In the case of SS1, a search is made for the satellite S1 with the antenna A1 and the antenna A2 changed over to each other, and, at the same time, in the case of SS2, a similar search is made for the satellite S2 with the antenna A1 and the antenna A2 changed over to each other. In either case, when the time of $t_{n1}+t_{n2}$ has elapsed, the search is made for the subsequent satellites, that is, the satellites S3 and S4, using the antenna A1 and then A2. When the search for the satellite S3 has been successfully completed as described above, the collection of the demodulation data will be started. After the end of this data collection, the procedure proceeds to searching for the next satellite.

In the above explanation, it was indicated that when the satellite could be searched out by the antenna A1, update is made by adding 1 to the value of $t_{n1}$ at Step 405. When the satellite could be found by the antenna A2, the procedure proceeds from Step 409 to Step 411 via Step 410, updating is made by adding 1 to the value of $t_{n2}$. In the processing at Steps 405 and 411, the values $t_{n1}$ and $t_{n2}$ are updated. This is due to high probability of searching the subsequent satellites by the use of the antenna which was effective in previous satellite searching. With such a change of search time, a change is made in the ratio of use of the antennas A1 and A2 for the search of each satellite shown in FIG. 9. Also, the sequence of use of the antennas A1 and A2 for searching a new satellite Sn is changed in accordance with the values of tn1 and $t_{n2}$. That is, if the value of $t_{n2}$ is greater than that of tn1, a decision of NO is made at Step 303 in FIG. 5, the procedure proceeds to Step 305, where search for satellites starts with the antenna A2.

When three or more satellites have been successfully searched out by a series of processing described above, a decision of YES is made at the time of arrival at Step 206 in FIG. 4, and then the procedure proceeds to Step 207, at which computation is made of a pseudo-distance from the satellites thus searched out. When more than four satellites have been searched out, four optimum satellites are selected to perform computation of a pseudo-distance to these satellites. This pseudo-distance computation can be done by computing a time difference between the signal transmission time of each satellite and the time of reception of these signals. After the completion of this pseudo-distance computation, at Step 208 computation of measuring position is executed to find out the present position of the vehicle by solving known simultaneous equations on the basis of pseudo-distances and satellite positions. Computed values will be sent to the navigation computer 4.

Figure 10:
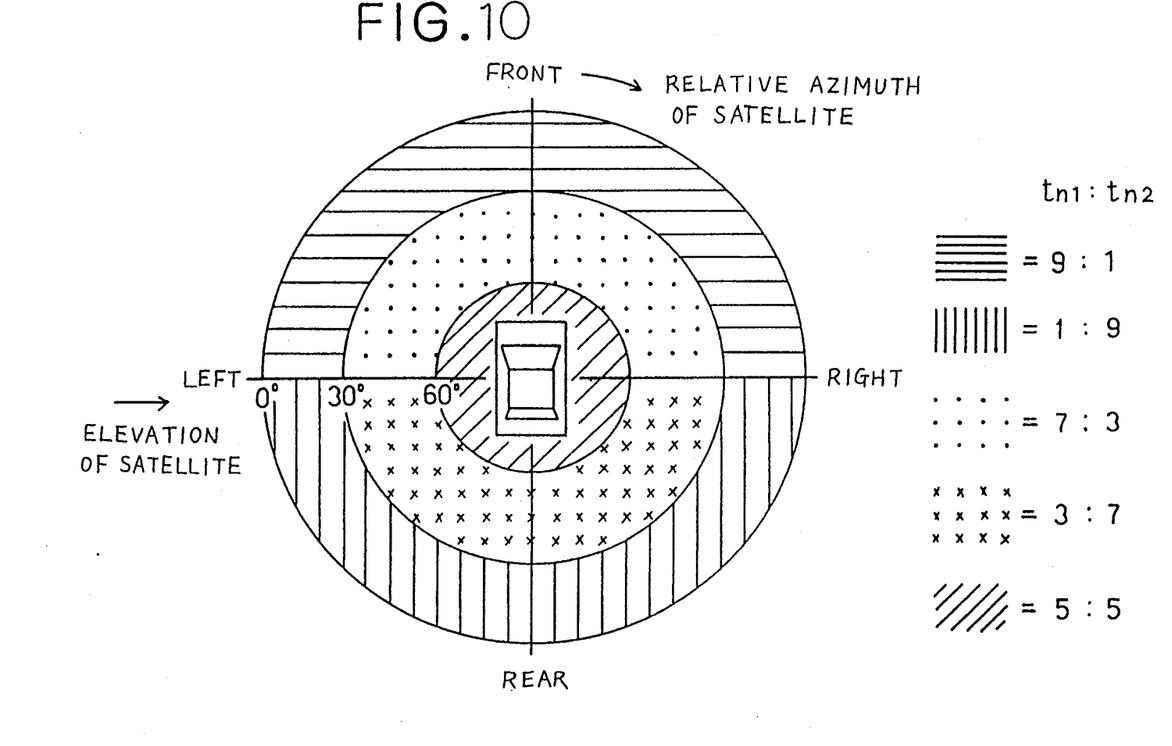
FIG. 10 is an explanatory view used in the explanation of a second embodiment of the present invention.
Figure 11:
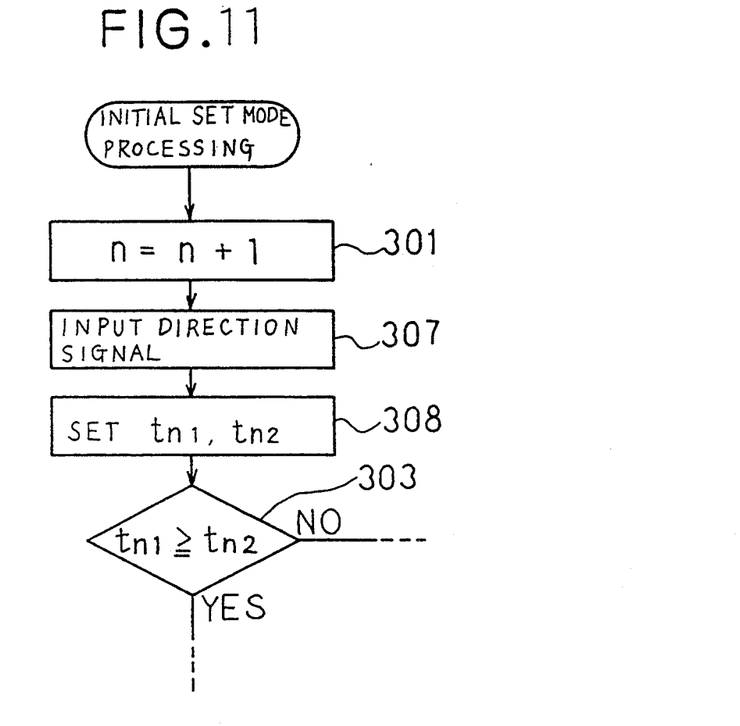
FIG. 11 is a flowchart showing a part of model processing in the second embodiment of the present invention.

In the above-described embodiment, the importance of the use of the antennas A1 and A2 and the sequence of use of these antennas were determined by changing the values of tn1 and tn2, but may be determined from a relationship between the relative azimuths of satellites relative to the direction of travel of the vehicle and the angle of elevation of the satellites. In the following this embodiment will be explained. The arithmetic and control unit 3, as shown in FIG. 10, prestores (stored in a ROM) in the form of a map the ratio of tn1 and tn2 of a range which is determined from the relationship between the relative azimuths of the satellites relative to the direction of travel of the vehicle and the angle of elevation of the satellites, and further is supplied with signals from an terrestrial magnetism sensor (not shown) which detects the direction of travel of the vehicle. Furthermore, in the processing at the arithmetic and control unit 3, the initial set mode processing in FIG. 5 is partly changed. That is, at Step 307 a direction signal is inputted from the terrestrial magnetism sensor and then at Step 308 the values of $t_{n1}$ and $t_{n2}$ are set by use of the map shown in FIG. 10 from the relationship between an azimuth data and the locations of the satellites to be determined at Step 101 in FIG. 3. Subsequent processing can be executed in the similar manner as described above, but since $t_{n1}$ and $t_{n2}$ are given on the basis of the map, Steps 404, 405, 410 and 411 for changing $t_{n1}$ and $t_{n2}$ shown in FIG. 6 will not be explained.

Which antenna of A1 and A2 is to be used first depends upon the value of $t_{n1}$ and $t_{n2}$ as described above, but may be fixed by setting either antenna first.

Figure 12:
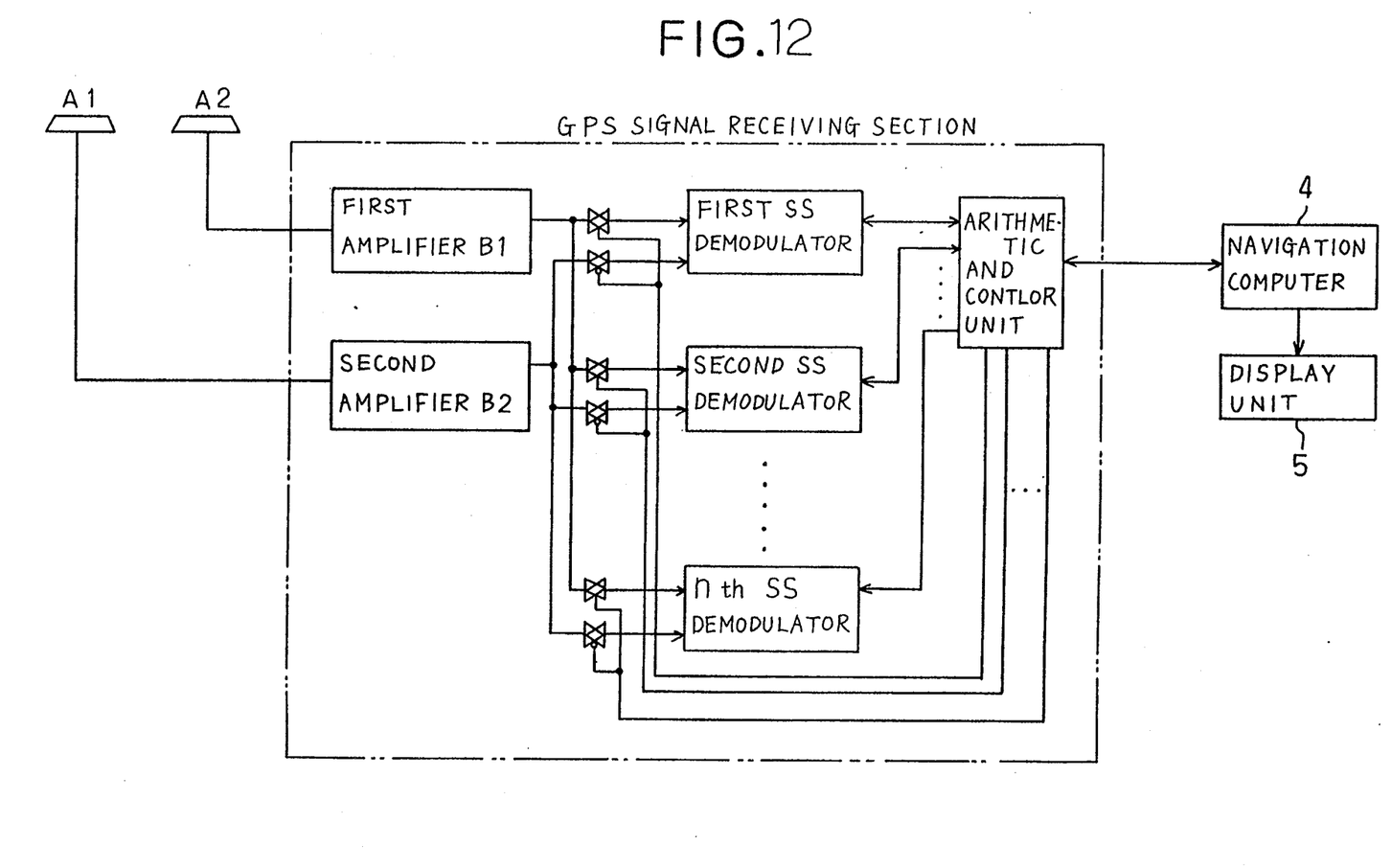
FIG. 12 is a general block diagram showing the general constitution of a third embodiment according to the present invention.

With regard to the SS demodulators, two SS demodulators 2a and 2b have been given, but, as shown in FIG. 12, an n-number of SS demodulators may be provided so as to search out many satellites at the same time, for the purpose of reducing the time from the supply of power to the receiver to the calculation of a present position and also improving the rate of position measurement during travel.

Further, the high-frequency amplifier mounted between the antennas and the analog switches has been described, but may be mounted between the analog switches and the SS demodulator.

While only certain embodiments of this invention have been described, it will be apparent to those skilled in the art that various changes and modifications may be made therein without departing from the spirit and scope of this invention as claimed.

What is claimed is:

1. A diversity type GPS for a vehicle for computing a position of the vehicle on the basis of rf signals received from a plurality of satellites, comprising:

first and second antennas, mounted at first and second discrete positions, respectively, in a compartment of a vehicle, for receiving rf signals from a plurality of satellites, and signal receiving means for demodulating rf signals from said satellites on the basis of signals received from said first and second antennas, and for computing a position of said vehicle on the basis of the demodulated data, said signal receiving means comprising:

first and second demodulators, each for receiving a search command for a specific satellite, for performing a satellite search operation in accordance with said signals received by a selected one of said first and second antennas, and for demodulating said received signals when said satellite search operation is effected, first switching means for selectively inputting signals received from said first and second antennas to said first demodulator, second switching means for selectively inputting signals received from said first and second antennas to said second demodulator, control means for outputting said search command for a first satellite to said first demodulator, for outputting a first antenna selection command for selection of either said first or second antenna to said first switching means, for outputting said search command for a second satellite to said second demodulator, and for outputting a second antenna selection command for selection of either said first or second antenna to said second switching means, and computing means for computing the position of said vehicle, wherein said first and second demodulators simultaneously search out said first and second satellites.

2. A diversity type GPS according to claim 1, wherein said control means comprises means for controlling said first and second switching means respectively, during said respective search operation of said first and second demodulators, so as to switch from a selected one of said first and second antennas to the other one of said first and second antennas after a first predetermined time, and means for continuing said search operation for a second predetermined time by using signals received from said other one of said first and second antenna thus switched, and wherein said control means outputs said search command for a third satellite to said first demodulator as soon as said first satellite is found by said first demodulator while said second demodulator continues to search out said second satellite.

3. A diversity type GPS for a vehicle for computing a position of the vehicle on the basis of rf signals received from a plurality of satellites, comprising:

first and second antennas, mounted at first and second discrete positions, respectively, in a compartment of a vehicle for receiving rf signals from a plurality of satellites, and signal receiving means for demodulating rf signals from said satellites on the basis of signals received from said first and second antennas, and for computing a position of said vehicle on the basis of the demodulated data, said signal receiving means comprising:

first and second demodulators, each for receiving a search command for a specific satellite, for performing a satellite search operation in accordance with said signals received by a selected one of said first and second antennas, and for demodulating said received signals when said satellite search operation is effected, first switching means for selectively inputting signals received from said first and second antennas to said first demodulator, second switching means for selectively inputting signals received from said first and second antennas to said second demodulator, control means for outputting said search command for a first satellite to said first demodulator, for outputting a first antenna selection command for selection of either said first or second antenna to said first switching means, for outputting said search command for a second satellite to said second demodulator, and for outputting a second antenna selection command for selection of either said first or second antenna to said second switching means, and computing means for computing the position of said vehicle, wherein said first and second demodulators simultaneously search out said first and second satellites, said control means comprises means for controlling said first and second switching means respectively, during said respective search operation of said first and second demodulators, so as to switch from a selected one of said first and second antennas to the other one of said first and second antennas after a first predetermined time, and means for continuing said search operation for a second predetermined time by using signals received from said other one of said first and second antenna thus switched, and said control means further comprises means for changing the switching timing of said first and second antennas in order to improve the rate of use of the one of said first and second antenna which was effective in a previous search operation when searching out the same satellite.

4. A diversity type GPS for a vehicle for computing a position of the vehicle on the basis of rf signals received from a plurality of satellites, comprising:

first and second antennas, mounted at first and second discrete positions, respectively, in a compartment of a vehicle for receiving rf signals from a plurality of satellites, and signal receiving means for demodulating rf signals from said satellites on the basis of signals received from second antennas, and for computing a position of said vehicle on the basis of the demodulated data, said signal receiving means comprising:

first and second demodulators, each for receiving a search command for a specific satellite, for performing a satellite search operation in accordance with said signals received by a selected one of said first and second antennas, and for demodulating said received signals when said satellite search operation is effected, first switching means for selectively inputting signals received from said first and second antennas to said first demodulator, second switching means for selectively inputting signals received from said first and second antennas to said second demodulator, control means for outputting said search command for a first satellite to said first demodulator, for outputting a first selection command for selection of either said first or second antenna to said first switching means, for outputting said search command for a second satellite to said second demodulator, and for outputting a second antenna selection command for selection of either said first or second antenna to said second switching means, computing means for computing the position of said vehicle, and a terrestrial magnetism sensor for sensing the vehicle's direction of travel, and wherein said first and second demodulators simultaneously search out said first and second satellites, said control means comprises means for controlling said first and second switching means respectively, during said respective search operation of said first and second demodulators, so as to switch from a selected one of said first and second antennas to the other one of said first and second antennas after a first predetermined time, and means for continuing said search operation for a second predetermined time by using signals received from said other one of said first and second antenna thus switched, and said control means further comprises means for storing data of the rate of use of said first and second antennas on the basis of relative azimuths of said satellites relative to the direction of said vehicle, means for detecting said relative azimuth of said specific satellite, and means for changing the switching timing of said first and second antennas on the basis of said detected relative azimuth.

5. A diversity type GPS according to claim 1, wherein said control means further comprises means for successively repeating the search operation by said first and second demodulators between a larger number of selected satellites than the number of said first and second satellites.

6. A diversity type GPS according to claim 1, wherein said first and second switching means comprises analog switches respectively.

7. A diversity type GPS according to claim 1, further comprising high-frequency amplifying means for amplifying signals received by said first and second antennas and applying the amplified signals to said first and second switching means.

8. A diversity type GPS according to claim 1, further comprising a third demodulator mounted in parallel with said first and second demodulators, and third switching means for inputting, into said third demodulator, signals received from said first and second antennas.

9. A diversity type GPS for a vehicle for computing a position of the vehicle on the basis of rf signals received from a plurality of satellites, comprising:

first and second antennas, mounted at first and second discrete positions, respectively, in a compartment of a vehicle, for receiving rf signals from a plurality of satellites, and signals receiving means for demodulating rf signals from said satellites on the basis of signals received from said first and second antennas and for computing a position of said vehicle on the basis of the demodulated data, said signal receiving means comprising:

first and second demodulators, each for receiving a search command for a specific satellite, for performing a satellite search operation in accordance with said signals received by a selected one of said first and second antennas, and for demodulating said received signals when said search operation is effected, switching means for selectively inputting signals received from said first and second antennas to said first and second demodulators, control means for simultaneously outputting said search command for a first satellite to said first demodulator and said search command for a second satellite to said second demodulator, and for outputting said search command for a third satellite to said first demodulator as soon as said search operation for said first satellite is effected, even if the search operation of said second satellite by said second demodulator continues, and computing means for computing the position of said vehicle.

10. A diversity type GPS according to claim 9, wherein said control means controls said switching means so that, during the search operation for said first satellite by said first demodulator, one of said first and second antennas which is connected to said demodulator is switched to the other one of said first and second antennas.

11. A diversity type GPS according to claim 10, wherein said control means controls said switching means so that, during the search operation for said second satellite by said second demodulator, one of said first and second antennas which is connected to said second demodulator is switched to the other one of said first and second antennas.

12. A diversity type GPS according to claim 9, wherein said switching means comprises first switching means for selectively inputting a signal received from said first antenna to said first and second demodulators, and second switching means for selectively inputting a signal received from said second antenna to said first and second demodulators.

13. A diversity type GPS according to claim 12, wherein said control means further comprises means for outputting to said first and second switching means an antenna selection command for determining the input, to said first and second demodulators, of signals received from one of said first and second antennas when a search command is produced to said respective first and second demodulators.

14. A diversity type GPS according to claim 13, wherein said control means further comprises means for controlling said first and second switching means respectively, during said respective search operation of said first and second demodulators, so as to switch from a selected one of said first and second antennas to the other one of said first and second and means for continuing said search operation by using signals received from said one of said first and second antenna thus switched.

15. A diversity type GPS for a vehicle for computing a position of the vehicle on the basis of rf signals received from a plurality of satellites, comprising:

first and second antennas, mounted at first and second discrete positions in a compartment of a vehicle, for receiving rf signals from a plurality of satellites, and signal receiving means for demodulating rf signals from said satellites on the basis of signals received from said first and second antennas and for computing a position of said vehicle on the basis of the demodulated data, said signal receiving means comprising:

first and second demodulators, each for receiving a search command for a specific satellite, for performing a satellite search operation in accordance with said signals received by a selected one of said first and second antennas, and for demodulating said received signals when said search operation is effected, switching means for selectively inputting signals received from said first and second antennas to said first and second demodulators, control means for outputting said search command for a first satellite to said first demodulator and said search command for a second satellite to said second demodulator, computing means for computing the position of said vehicle, and wherein said switching means comprises first switching means for selectively inputting a signal received from said first antenna to said first and second demodulators, and second switching means for selectively inputting a signal received from said second antenna to said first and second demodulators, said control means further comprises means for outputting to said first and second switching means an antenna selection command for determining the input, to said first and second demodulators, of signals received from one of said first and second antennas when a search command is produced to said respective first and second demodulators, said control means further comprises means for controlling said first and second switching means respectively, during said respective search operation of said first and second demodulators, so as to switch from a selected one of said first and second antennas to the other one of said first and second antennas, and means for continuing said search operation by using signals received from said one of said first and second antenna thus switched, and said control means further comprises means for changing the switching timing of said first and second antennas in order to improve the rate of use of the one of said first and second antenna which was effective in a previous search operation when searching out the same satellite, 16. A diversity type GPS for a vehicle for computing a position of the vehicle on the basis of rf signals received from a plurality of satellites, comprising:

first and second antennas, mounted at first and second discrete positions in a compartment of a vehicle, for receiving rf signals from a plurality of satellites, and signal receiving means for demodulating rf signals from said satellites on the basis of signals received from said first and second antennas and for computing a position of said vehicle on the basis of the demodulated data, said signal receiving means comprising:

first and second demodulators, each for receiving a search command for a specific satellite, for performing a satellite search operation in accordance with said signals received by a selected one of said first and second antennas, and for demodulating said received signals when said search operation is effected, switching means for selectively inputting signals received from said first and second antennas to said first and second demodulators, control means for outputting said search command for a first satellite to said first demodulator and said search command for a second satellite to said second demodulator, computing means for computing the position of said vehicle, a terrestrial magnetism sensor for sensing the vehicle's direction of travel, and wherein said switching means comprises first switching means for selectively inputting a signal received from said first antenna to said first and second demodulators, and second switching means for selectively inputting a signal received from said second antenna to said first and second demodulators, said control means further comprises means for outputting to said first and second switching means an antenna selection command for determining the input to said first and second demodulators, of signals received from one of sad first and second antennas when a search command is produced to said respective first and second demodulators, said control means further comprises means for controlling said first and second switching means respectively, during said respective search operation of said first and second demodulators, so as to switch from a selected one of said first second antennas to the other one of said first and second antennas, and means for continuing said search operation by using signals received from said one of said first and second antenna thus switched, and said control means further comprises means for storing data of the rate of use of said first and second antennas on the basis of relative azimuths of said satellites relative to the direction of said vehicle, means for detecting said relative azimuth of said specific satellite, and means for changing the switching timing of said first and second antennas on the basis of said detected relative azimuth.

17. A diversity type GPS according to claim 12, wherein said first and second switching means comprises analog switches respectively.

18. A diversity type GPS according to claim 9, further comprising a third demodulator mounted in parallel with said first and second demodulators, and third switching means for inputting to said third demodulator signals received from said first and second antennas.

19. A diversity type GPS according to claim 9, further comprising high-frequency amplifying means for amplifying signals received from said first and second antennas and applying the amplified signals to said first and second switching means.

* * * * *